United States Patent
Tsuta et al.

(10) Patent No.: US 11,311,962 B2
(45) Date of Patent: Apr. 26, 2022

(54) FRICTION STIR WELDING TOOL

(71) Applicant: HONDA MOTOR CO., LTD., Tokyo (JP)

(72) Inventors: Keisuke Tsuta, Wako (JP); Mitsuru Sayama, Wako (JP); Akiyoshi Miyawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 16/833,073

(22) Filed: Mar. 27, 2020

(65) Prior Publication Data
US 2020/0306876 A1  Oct. 1, 2020

(30) Foreign Application Priority Data
Mar. 29, 2019  (JP) .............................. JP2019-068954

(51) Int. Cl.
*B23K 20/12* (2006.01)

(52) U.S. Cl.
CPC ................................. *B23K 20/1255* (2013.01)

(58) Field of Classification Search
CPC ............ B23K 20/1255; B23K 20/1225; B23K 20/129; B23K 2101/24; B23K 2101/36; B23K 20/124; B23K 20/126; B23K 20/1265; B23K 2101/06; B23K 2103/10; B23K 37/0531; B23K 37/06
See application file for complete search history.

(56) References Cited

U.S. PATENT DOCUMENTS 6,676,008 B1    1/2004  Trapp et al.

FOREIGN PATENT DOCUMENTS

| CN | 101157156 A | 4/2008 |
| CN | 103521912 A | 1/2014 |
| CN | 203830901 U | 9/2014 |
| JP | 101157156 A | 4/2008 |
| JP | 2008-307606 A | 12/2008 |

OTHER PUBLICATIONS

CN103521912A computer translation (Year: 2021).*
Office Action including search report dated Jun. 9, 2021 issued over the corresponding Chinese Patent Application No. 202010231150.9 with an English translation of the pertinent portion.
Office Action dated Mar. 8, 2022 issued over the corresponding Japanese Patent Application No. 2019-068954 with the English translation thereof.

* cited by examiner

*Primary Examiner* — Erin B Saad
(74) *Attorney, Agent, or Firm* — Carrier Blackman & Associates, P.C.; Joseph P. Carrier; Jeffrey T. Gedeon

(57) ABSTRACT

A friction stir welding tool includes a probe having a front end surface and an outer circumferential surface. Outer circumferential recesses are formed in the probe. The outer circumferential recesses extend along the rotational axis of the probe up to the front end surface. The friction stir welding tool rotates the probe about the rotation axis, and embeds the probe inside a workpiece during rotation of the probe to weld the workpiece. A front end recess is formed in the front end surface. The front end recess is positioned at the central part of the front end surface, and connected to the outer circumferential recesses.

6 Claims, 8 Drawing Sheets

FRICTION STIR WELDING TOOL

CROSS-REFERENCE TO RELATED APPLICATION

This application is based upon and claims the benefit of priority from Japanese Patent Application No. 2019-068954 filed on Mar. 29, 2019, the contents of which are incorporated herein by reference.

BACKGROUND OF THE INVENTION

Field of the Invention

The present invention relates to a friction stir welding tool which includes a probe having a front end surface and an outer circumferential surface, and welds a workpiece by rotating the probe about the rotation axis and embedding the probe inside the workpiece during rotation of the probe.

Description of the Related Art

Japanese Laid-Open Patent Publication No. 2008-307606 discloses, in FIG. 9 and paragraph [0007], a friction stir welding tool having outer circumferential recesses in an outer circumferential surface of a probe. The outer circumferential recesses extend along the rotation axis of the probe up to a front end surface of the probe.

SUMMARY OF THE INVENTION

In the above described friction stir welding tool described above, material of the workpiece softened by friction heat of the probe is taken into the outer circumferential recesses from a lateral side of the probe. The friction stir welding tool can generate plastic flow of the softened material toward the front end of the probe. However, since the front surface of the probe does not include any portion which stores material guided from the outer circumferential recesses, it may not be possible to smoothly generate plastic flow of the material taken into the outer circumferential recesses toward the front end of the probe. Therefore, it may not be possible to obtain the desired welding quality.

The present invention has been made taking such a task into consideration, and an object of the present invention is to provide a friction stir welding tool in which is it possible to obtain the desired welding quality.

According to an aspect of the present invention, a friction stir welding tool is provided. The friction stir welding tool includes a probe having a front end surface and an outer circumferential surface, wherein an outer circumferential recess extending up to the front end surface is formed in the outer circumferential surface, and the friction stir welding tool is configured to rotate the probe about the rotation axis, and embed the probe inside a workpiece during rotation of the probe to weld the workpiece, and wherein a front end recess is formed in the front end surface, and the front end recess is positioned at a central part of the front end surface, and connected to the outer circumferential recess.

In the present invention, the front end recess connected to the outer circumferential recess is formed in the front end surface of the probe. In the structure, it is possible to store the softened material taken into the outer circumferential recess, in the front end recess. That is, it is possible to smoothly generate plastic flow of the softened material taken into the outer circumferential recess toward the front end of the probe. Thus, it is possible to obtain the desired welding quality.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a friction stir welding tool according to the present invention will be described in relation to a friction stir welding system with reference to the accompanying drawings.

Figure 1:
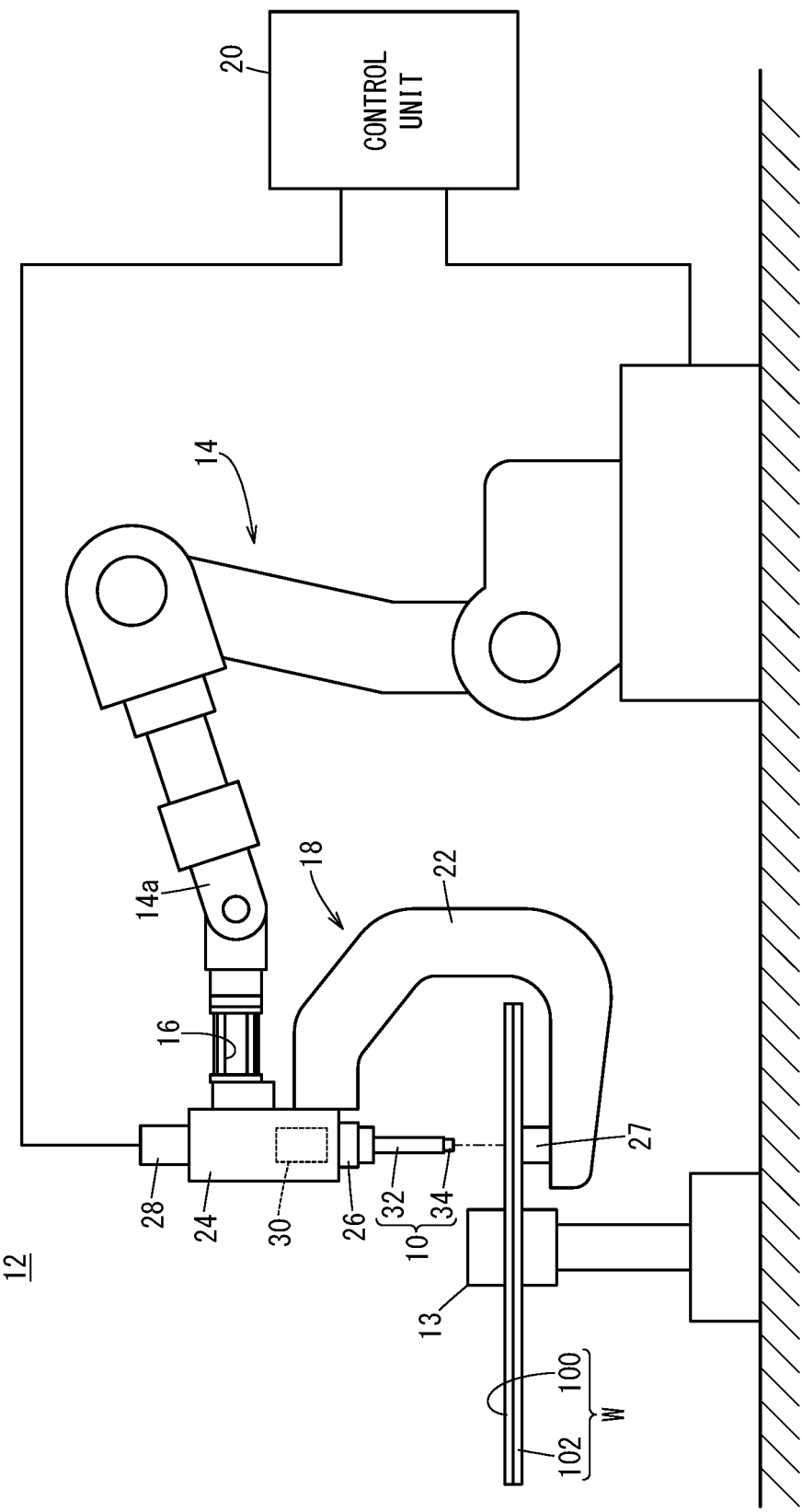
FIG. 1 is a view schematically showing overall structure of a friction stir welding system including a friction stir welding tool according to an embodiment of the present invention.

As shown in FIG. 1, a friction stir welding system 12 is configured to perform friction stir welding (FSW) of a workpiece W by, while rotating a friction stir welding tool 10 (hereinafter also referred to as the "welding tool 10", pressing the friction stir welding tool 10 against the workpiece W.

For example, the workpiece W includes a first member 100 in the form of a plate, and a second member 102 in the form of a plate. In the state where the first member 100 and the second member 102 are stacked together, the workpiece W is fixed to a fixing base 13.

Each of the first member 100 and the second member 102 is made of metal material such as aluminum, magnesium, copper, iron, titanium, or alloy of these materials, etc. The first member 100 and the second member 102 may be made of the same material, or may be made of different materials. It should be noted that at least one of the first member 100 and the second member 102 may be made of resin material. The size and the shape of the first member 100 and the second member 102 may be determined as necessary.

The friction stir welding system 12 includes an industrial multi-joint robot 14, a welding device body 18 provided at a front end of a robot arm 14a of the robot 14 through a connector 16, the welding tool 10 detachably attached to the welding device body 18, and a control unit 20 which controls the entire system totally.

The robot 14 adjusts the position and the orientation of the welding device body 18 relative to the workpiece W to move the welding tool 10 relative to the workpiece W. Specifically, in the case of performing line welding of the workpiece W, the robot 14 adjusts the position and the orientation of the welding device body 18 in a manner that the welding tool 10 moves in a welding direction (in a direction indicated by an arrow F in FIG. 4) relative to the workpiece W. That is, the robot 14 functions as means for moving and tilting the welding tool 10.

The welding device body 18 includes a C-shaped support arm 22, a drive unit 24 provided at one end of the support arm 22, a chuck 26 provided for the drive unit 24 to clamp the welding tool 10, and a receiver member 27 provided at the other end of the support arm 22.

Figure 2:
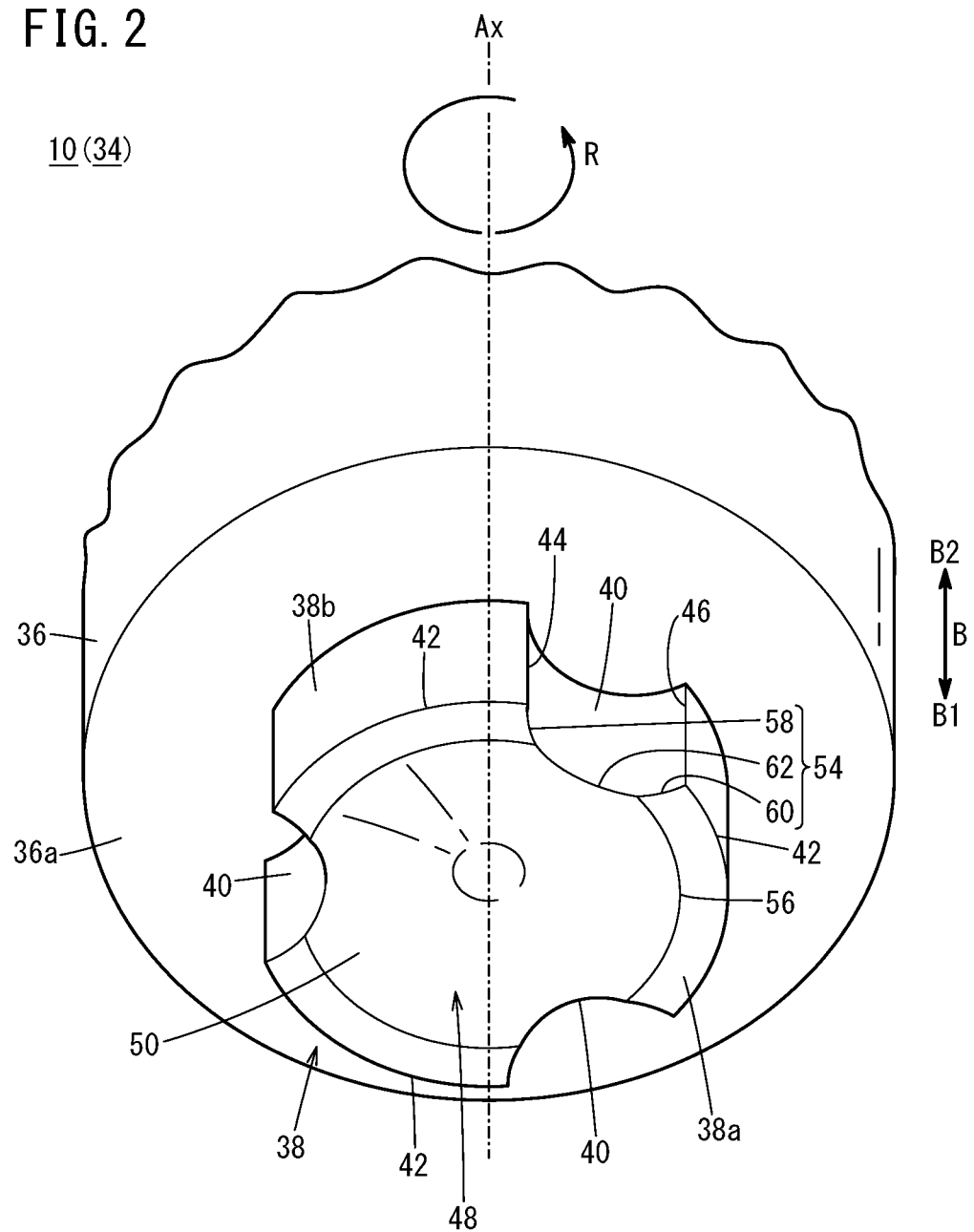
FIG. 2 is a partial perspective view showing the friction stir welding tool.

The drive unit 24 includes a rotary motor 28 for rotating the welding tool 10 attached to the chuck 26 in a predetermined rotation direction (in a direction indicated by an arrow R in FIG. 2), and an actuator 30 for moving the welding tool 10 back and forth in a direction of a rotation axis Ax (in a direction indicated by an arrow B in FIG. 2). At the time of performing friction stir welding of the workpiece W, the receiver member 27 is positioned opposite to the chuck 26 (welding tool 10) such that the workpiece W is positioned between the receiver member 27 and the chuck 26. The receiver member 27 receives a pressing force (pressure force) applied from the welding tool 10 to the workpiece W.

The welding tool 10 includes a substantially hollow-cylindrical holder 32 and a tool 34 detachably attached to the holder 32. The proximal end of the holder 32 is clamped by the chuck 26. The tool 34 can be attached to a front end of the holder 32 coaxially with the holder 32. The tool 34 is consumable. When the tool 34 is worn out as a result of friction stir welding, the tool 34 is replaced with new one.

Figure 3A:
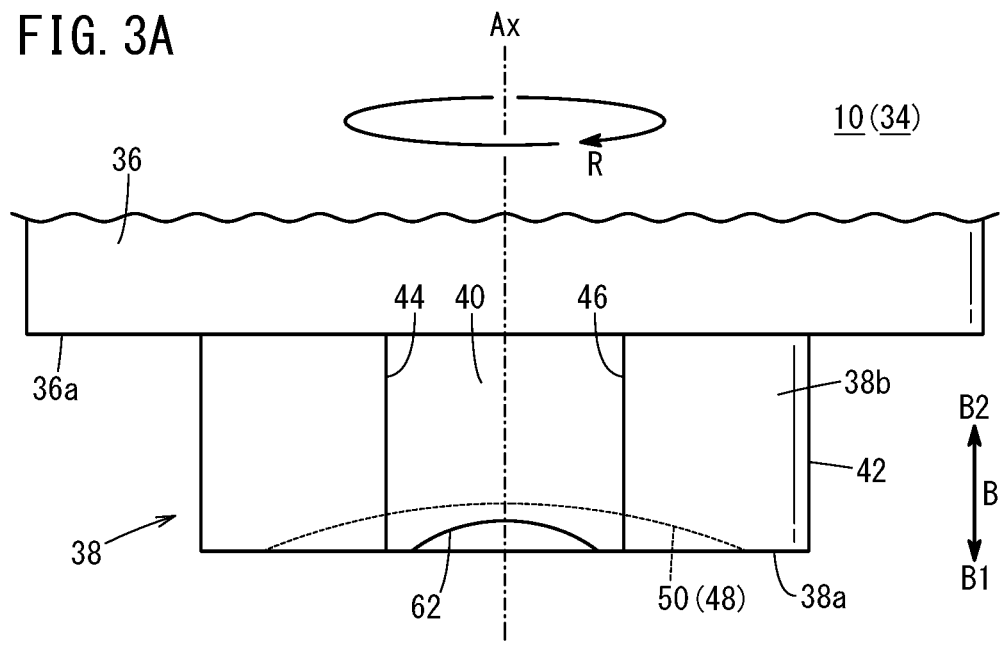
FIG. 3A is a side view showing the friction stir welding tool in FIG. 2.
Figure 3B:
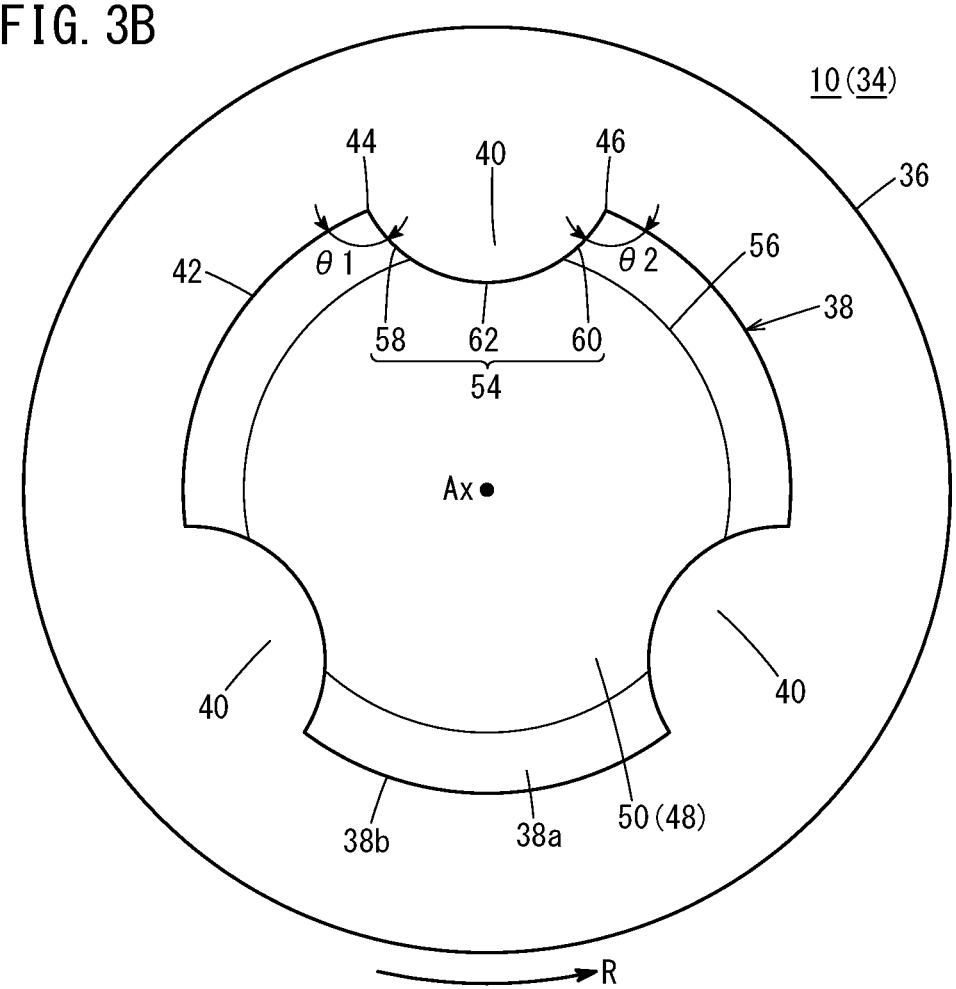
FIG. 3B is a view showing the friction stir welding tool in FIG. 2, where the friction stir welding tool is viewed from a front end.

As shown in FIGS. 2 to 3B, the tool 34 includes a substantially cylindrical shoulder 36, and a small diameter probe 38 provided on a front end surface 36a of the shoulder 36. The welding tool 10 welds the workpiece W by rotating the probe 38 in the direction indicated by the arrow R about the rotation axis Ax and embedding the probe 38 inside the workpiece W during rotation of the probe 38.

The tool 34 is produced by machining (cutting) cylindrical metal material. It should be noted that the tool 34 may be produced by a method other than machining (e.g., by means of casting, stacking, etc.). Examples of materials suitably employed in the tool 34 includes tool steels having hardness higher than that of the workpiece W, and having excellent heat resistance and wear resistance. It should be noted that the materials of the tool 34 are not limited to the tool steels, and can be determined as necessary.

The proximal end (end in a direction indicated by an arrow B2) of the shoulder 36 is detachably attached to the holder 32 (see FIG. 1). The front end surface 36a of the shoulder 36 (end surface in a direction indicated by an arrow B1) has a flat shape (see FIGS. 2 and 3A).

The probe 38 protrudes from the front end surface 36a of the shoulder 36 in a front end direction (indicated by an arrow B1) (see FIGS. 2 and 3A). The probe 38 is provided coaxially with the shoulder 36. The outer diameter and the protruding length of the probe 38 can be determined as necessary depending on the shape, the size, the material, etc. of the workpiece W as a welding target.

The probe 38 has a cylindrical shape, and includes a front end surface 38a and an outer circumferential surface 38b. A plurality of (three, in the illustrated embodiment) outer circumferential recesses 40 (side surface grooves) extending up to the front end surface 38a along the rotation axis Ax of the probe 38 are formed in the outer circumferential surface 38b of the probe 38. Each of the outer circumferential recesses 40 is in the form of a groove.

The plurality of outer circumferential recesses 40 are arranged at equal intervals of angle (at intervals of 120°, in the illustrated embodiment) in a circumferential direction of the probe 38 (see FIGS. 2 and 3B). Each of the outer circumferential recesses 40 has a substantially constant width from the outer circumferential surface 38b toward the front end surface 38a of the probe 38. The proximal end of each of the outer circumferential recesses 40 is positioned at the proximal end of the probe 38.

The probe 38 has claws 42 between the outer circumferential recesses 40 that are adjacent to each other in the circumferential direction of the probe 38. Stated otherwise, the number of the claws 42 of the probe 38 corresponds to the number of the outer circumferential recesses 40.

In FIGS. 2 and 3A, a first outer circumferential edge 44 and a second outer circumferential edge 46 are formed in the outer circumferential surface 38b of the probe 38. The first outer circumferential edge 44 forms a marginal portion on the front side in the rotation direction of the probe 38 (indicated by an arrow R) in each of the outer circumferential recesses 40. The first outer circumferential edge 44 extends in parallel to the rotation axis Ax of the probe 38. The proximal end of the first outer circumferential edge 44 (end in the direction indicated by the arrow B2) is positioned at the proximal end of the probe 38. The front end of the first outer circumferential edge 44 (end in the direction indicated by the arrow B1) is positioned at the front end surface 38a of the probe 38.

The second outer circumferential edge 46 forms a marginal portion on the rear side in the rotation direction of the probe 38 (direction opposite to the direction indicated by the arrow R) in each of the outer circumferential recesses 40. The second outer circumferential edge 46 extends in parallel to the rotational axis Ax of the probe 38. The proximal end of the second outer circumferential edge 46 (end in the direction indicated by the arrow B2) is positioned at the proximal end of the probe 38. The front end of the second outer circumferential edge 46 (end in the direction indicated by the arrow B1) is positioned on the front end surface 38a of the probe 38.

As shown in FIGS. 2 and 3B, the rotation axis Ax is positioned at the center of the front end surface 38a of the probe 38. A front end recess 48 is formed in the front end surface 38a of the probe 38. The front end recess 48 is positioned at the central part of the front end surface 38a, and connected to the outer circumferential recesses 40. The front end recess 48 includes a central recess 50 positioned at the center of the front end surface 38a. The front end recess 48 (central recess 50) is formed rotationally symmetrical about the rotation axis Ax.

As viewed from the front end of the probe 38, the central recess 50 has a shape formed by partially cutting outer marginal portion of a circle about the rotation axis Ax (circle slightly smaller than the outer circumference of the front end surface 38a of the probe 38) partially by the three outer circumferential recesses 40. In the structure, the central recess 50 is connected to each of the outer circumferential recesses 40. As viewed from the front end of the probe 38, the central recess 50 may have a shape formed by cutting the polygonal (e.g., triangular or quadrangular) outer marginal portion partially by the outer circumferential recesses 40.

The cross sectional shape of the wall surface of the central recess 50 taken along the rotation axis Ax has a circular arc shape. It should be noted that the cross sectional shape of the wall surface of the central recess 50 along the rotation axis Ax may be determined as necessary, and may be a U-shape or a V-shape. The portions of the front end surface 38a of the probe 38 around the central recess 50 are flat surfaces extending in directions perpendicular to the rotation axis Ax.

An outer front end edge 54 and an inner front end edge 56 are formed in the front end surface 38a of the probe 38. The outer front end edge 54 forms a front end marginal portion in each of the outer circumferential recesses 40. That is, the outer front end edge 54 couples the front end of the first outer circumferential edge 44 and the front end the second outer circumferential edge 46 together.

Specifically, the outer front end edge 54 includes a first edge 58, a second edge 60, and an intermediate edge 62. The first edge 58 forms a marginal portion in the front end surface of the claw 42, on the rear side in the rotation direction of the probe 38 (in the direction opposite to the direction indicated by the arrow R). The first edge 58 is coupled to the front end of the first outer circumferential edge 44. The first edge 58 extends inward from the front end of the first outer circumferential edge 44, toward the rotation axis Ax, with inclination toward the rear side in the rotation direction of the probe 38. That is, an angle θ1 defined between the outer circumferential surface 38b of the probe 38 and the first edge 58 is determined to be an obtuse angle.

The second edge 60 forms a marginal portion in the front end surface of the claw 42, on the front side in the rotation direction of the probe 38 (in the direction indicated by the arrow R). The second edge 60 is coupled to the front end of the second outer circumferential edge 46. The second edge 60 extends inward from the front end of the second outer circumferential edge 46, toward the rotation axis Ax, with inclination toward the front side in the rotation direction of the probe 38. That is, an angle θ2 defined between the outer circumferential surface 38b of the probe 38 and the second edge 60 is determined to be an obtuse angle.

The intermediate edge 62 couples the first edge 58 and the second edge 60 together. The intermediate edge 62 forms a border between the wall surface of the central recess 50 and the wall surface of the outer circumferential recess 40. The intermediate edge 62 extends in a circular arc shape.

The inner front end edge 56 forms an outer marginal portion of the central recess 50. Stated otherwise, the inner front end edge 56 forms a border between the wall surface of the central recess 50 and a front end surface of the claw 42. The inner front end edge 56 is coupled to the outer front end edge 54.

Next, an example of lap welding the first member 100 (e.g., an iron plate) and the second member 102 (an aluminum alloy plate) of the workpiece W together using the above described welding tool 10 will be described.

Figure 4:
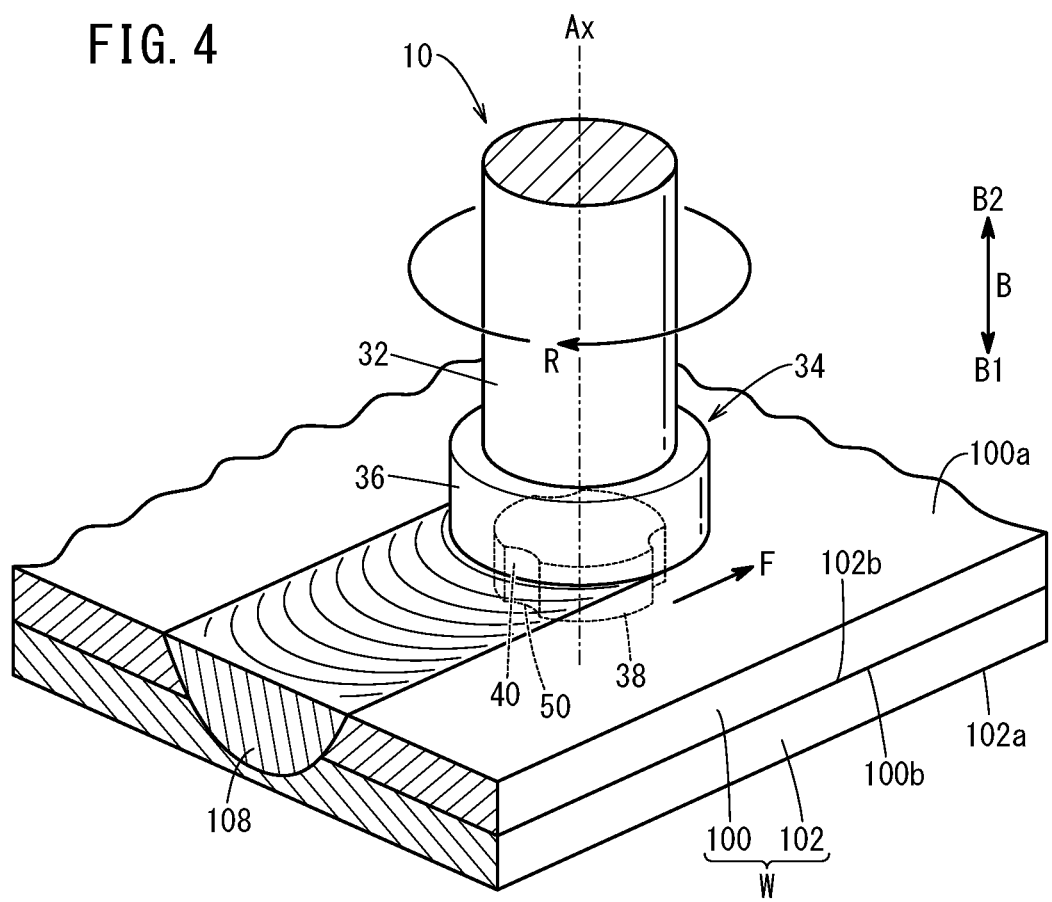
FIG. 4 is a perspective view showing lap welding using the friction stir welding tool shown in FIG. 2.
Figure 5:
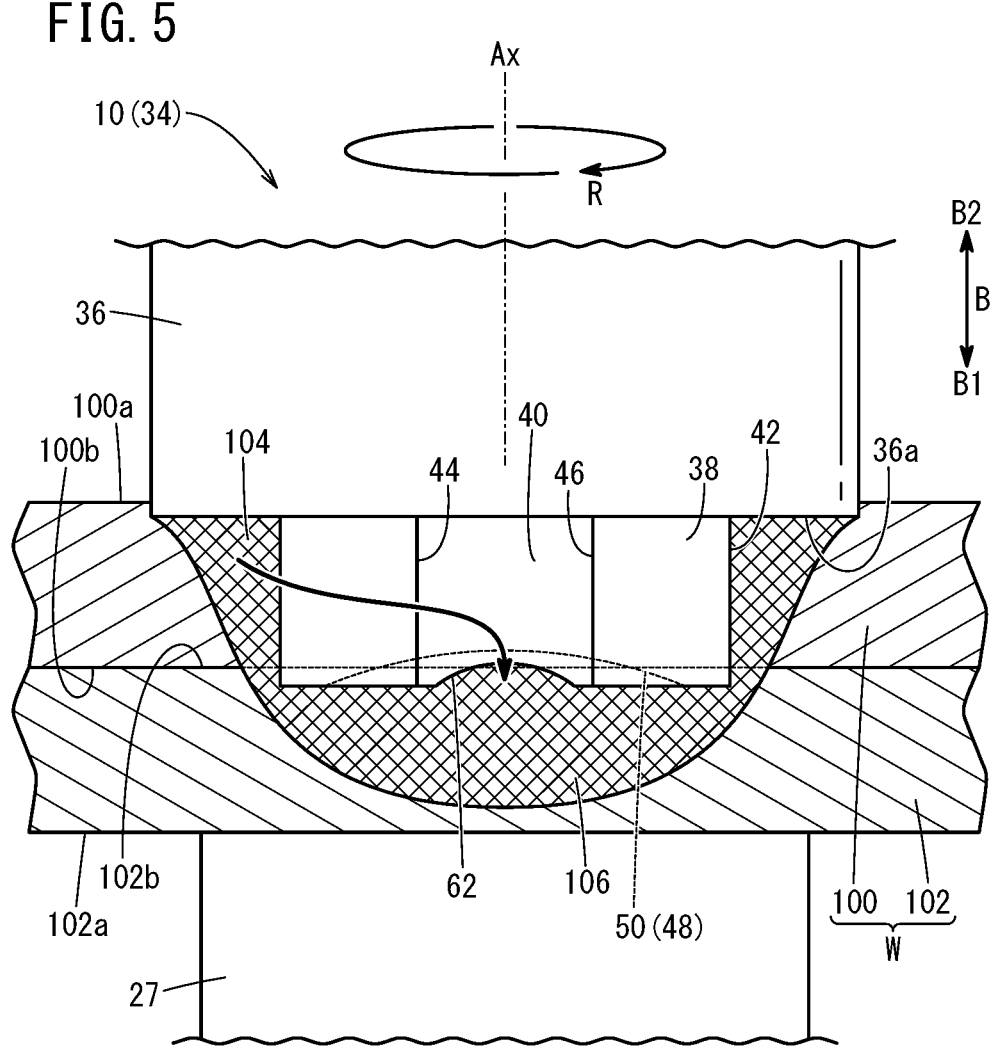
FIG. 5 is a cross sectional view showing lap welding in FIG. 4.

In this case, in FIG. 1, in the state where the first member 100 and the second member 102 are stacked together, the workpiece W is fixed to the fixing base 13. Specifically, as shown in FIGS. 4 and 5, one surface (first outer surface 100a) of the first member 100 is oriented toward the shoulder 36. The other surface (first inner surface 100b) of the first member 100 contacts one surface (second inner surface 102b) of the second member 102. The other surface (second outer surface 102a) of the second member 102 contacts the receiver member 27.

Then, the control unit 20 controls driving of the drive unit 24 to move the welding tool 10 toward the workpiece W (in the direction indicated by the arrow B1) while rotating the welding tool 10, and presses the front end surface 38a of the probe 38 against the first outer surface 100a of the first member 100.

As a result, as shown in FIG. 5, the probe 38 is inserted into the first member 100 while the probe 38 is machining the first member 100. At this time, since frictional heat is produced between the probe 38 and the first member 100, the portion of the first member 100 around the probe 38 is softened.

Then, when the front end surface 38a of the probe 38 reaches the second inner surface 102b of the second member 102, the probe 38 is inserted into the second member 102 while machining the second member 102. At this time, since frictional heat is produced between the probe 38 and the second member 102 and the frictional heat produced in the first member 100 is transmitted to the second member 102, the portion of the second member 102 around the probe 38 is softened. Then, the probe 38 is embedded in the workpiece W completely, and the front end surface 36a of the shoulder 36 is brought into contact with the first outer surface 100a of the first member 100.

The softened portion of the first member 100 (first softened material 104) and the softened portion of the second member 102 (second softened material 106) are dragged by rotation of the probe 38 to flow plastically, and stirred together.

Specifically, the first softened material 104 present on the lateral side of the probe 38 is taken into each of the plurality of outer circumferential recesses 40. The first softened material 104 taken into each of the outer circumferential recesses 40 is guided into the central recess 50, and mixed with (stirred with) the second softened material 106 at the front end of the probe 38.

Then, as shown in FIG. 4, by moving the welding tool 10 in the welding direction (in the direction indicated by an arrow F) while maintaining rotation and pressing of the welding tool 10, the first member 100 and the second member 102 are welded together integrally by friction stir welding. As a result, a joint portion 108 (joint bead) is formed in the workpiece W.

In this case, the welding tool 10 according to the embodiment of the present invention offers the following advantages.

The front end recess 48 is formed in the front end surface 38a of the probe 38. The front end recess 48 is positioned at the central part of the front end surface 38a, and connected to the outer circumferential recesses 40.

In the structure, it is possible to store the first softened material 104 taken into the outer circumferential recesses 40, in the front end recess 48. That is, it is possible to generate smooth plastic flow of the first softened material 104 taken into the outer circumferential recesses 40, toward the front end of the probe 38. In this manner, since it is possible to effectively stir the first softened material 104 and the second softened material 106 together, it is possible to obtain desired welding quality.

The front end recess 48 includes the central recess 50 positioned at the center of the front end surface 38a, and the outer circumferential recesses 40 are formed by cutting the outer marginal portion of the central recess 50 partially.

With the simple structure as described above, it is possible to connect the central recess 50 and the outer circumferential recesses 40 together.

The outer front end edge 54 is formed in the front end surface 38a of the probe 38. The outer front end edge 54 forms a marginal portion in the outer circumferential recess 40 in the front end direction of the probe 38. The outer front end edge 54 extends in a manner that the angles θ1, θ2 defined between the outer front end edge 54 and the outer circumferential surface 38b become obtuse angles.

In the structure, it is possible to increase the rigidity (strength) of a corner formed between the outer circumferential surface 38b of the probe 38 and the outer front end edge 54.

First Modified Embodiment

Next, a probe 38A according to a first modified embodiment will be described. In the description of the probe 38A, constituent elements having the structure identical to that of the probe 38 are labeled with the same reference numerals, and description thereof is omitted. Further, in the probe 38A, the structure similar to that of the probe 38 offers similar effects and advantages.

Figure 6A:
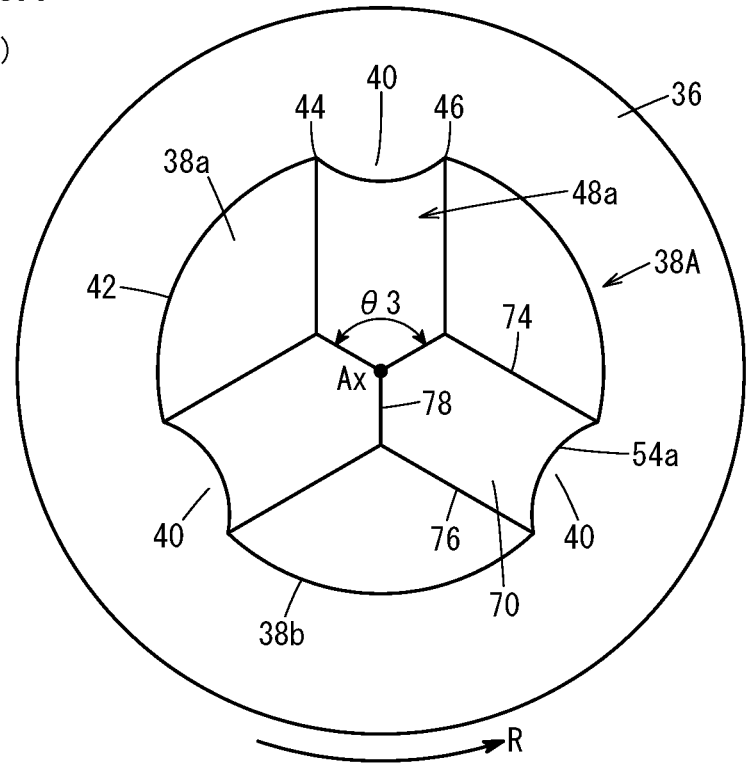
FIG. 6A is a view where a friction stir welding tool including a probe according to a first modified embodiment is viewed from a front end.

As shown in FIG. 6A, a front end recess 48a formed in the front end surface 38a of the probe 38A includes a plurality of (three, in the illustrated embodiment) front end grooves 70 extending outward in the radial direction of the probe 38A from the center of the front end surface 38a, and connected to the outer circumferential recesses 40. The front end recess 48a is rotationally symmetrical about the rotation axis Ax.

The plurality of front end grooves 70 have the same structure. The groove width of each of the front end grooves 70 is the same as the groove width of each of the outer circumferential recesses 40 (distance between the first outer circumferential edge 44 and the second outer circumferential edge 46). The wall surface of the front end groove 70 has a circular arc shape in lateral cross section. It should be noted that the lateral cross sectional shape of the wall surface of the front end groove 70 may be determined as necessary, and may be a U-shape, or a V-shape, etc. The portion of the front end surface 38a of the probe 38A other than the front end grooves 70 and the outer circumferential recesses 40 is a flat surface extending in a direction perpendicular to the rotation axis Ax.

An outer front end edge 54a, a first groove edge 74, a second groove edge 76, and a third groove edge 78 are formed in the front end surface 38a of the probe 38A. The outer front end edge 54a forms a front end marginal portion of the outer circumferential recess 40. Stated otherwise, the outer front end edge 54a forms a border between the wall surface of the front end groove 70 and the wall surface of the outer circumferential recess 40. The outer front end edge 54a couples the front end of the first outer circumferential edge 44 and the front end of the second outer circumferential edge 46 together.

The first groove edge 74 forms a lateral marginal portion in the front end groove 70 on the front side in the rotation direction of the probe 38A (in the direction indicated by the arrow R). An outer end of the first groove edge 74 positioned on the outer circumferential side of the probe 38A is coupled to the front end of the first outer circumferential edge 44.

The second groove edge 76 forms a lateral marginal portion in the front end groove 70 on the rear side in the rotation direction of the probe 38A (in the direction opposite to the direction indicated by the arrow R). The first groove edge 74 and the second groove edge 76 extend in parallel to each other on both sides of the front end groove 70. The outer end of the second groove edge 76 positioned on the outer circumferential side of the probe 38A is coupled to the front end of the second outer circumferential edge 46. With respect to the front end grooves 70 that are adjacent to each other, the inner end of the first groove edge 74 of one of the front end grooves 70 positioned on the central side of the probe 38A is coupled to the inner end of the second groove edge 76 of the other of the front end grooves 70 positioned on the central side of the prove 38A.

The third groove edge 78 is a ridge extending straight from the center of the front end surface 38a toward the coupling part where the first groove edge 74 and the second groove edge 76 are coupled together. An angle θ3 defied between the third groove edges 78 that are adjacent to each other is determined to be 120°.

In this modified embodiment, the front end recess 48a includes the front end grooves 70 extending outward in the radial directions of the probe 38A from the center of the front end surface 38a, and connected to the outer circumferential recesses 40.

In the structure, it is possible to guide the first softened material 104 which flowed from the outer circumferential recesses 40 into the front end grooves 70 toward the central part of the front end surface 38a of the prove 38A efficiently.

The number of the outer circumferential recesses 40 is three, and the number of the front end grooves 70 is three. The third groove edges 78 are formed in the front end surface 38a. Each of the third groove edges 78 extends from the center of the front end surface 38a in a manner to divide the front end grooves 70 that are adjacent to each other.

In the structure, the first softened material 104 which flows plastically through the front end grooves 70 can be brought into contact with the third groove edges 78, and guided in the front end direction of the probe 38A. In this manner, in the front end direction of the probe 38A, it is possible to stir the first softened material 104 and the second softened material 106 together more effectively.

Second Modified Embodiment

Next, a probe 38B according to a second modified embodiment will be described. In the description of the probe 38B, constituent elements having the structure identical to that of the probe 38A are labeled with the same reference numerals, and description thereof is omitted. Further, in the probe 38B, the structure similar to that of the probe 38A offers similar effects and advantages.

Figure 6B:
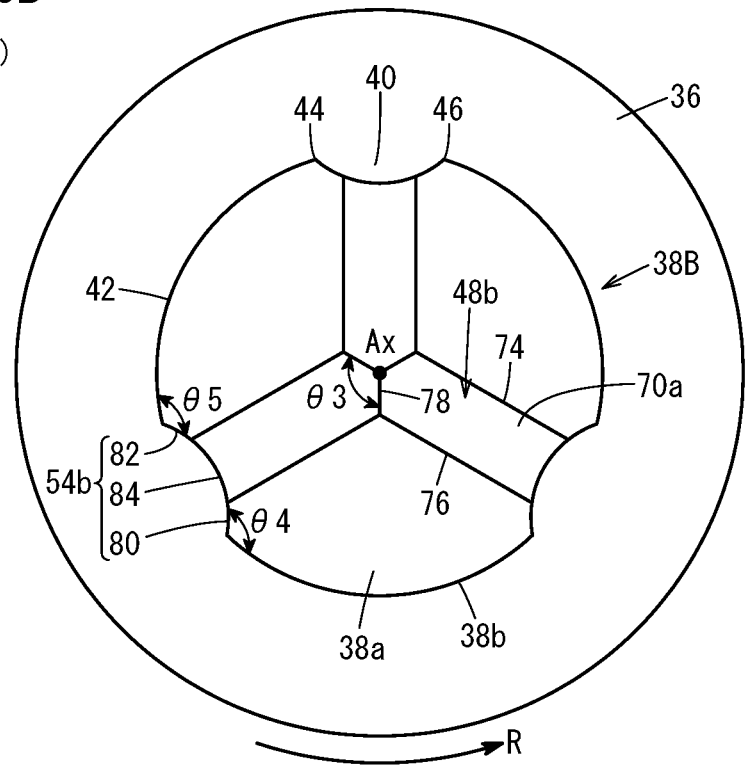
FIG. 6B is a view where a friction stir welding tool including a probe according to a second modified embodiment is viewed from a front end.

As shown in FIG. 6B, a front end recess 48b formed in a front end surface 38a of the probe 38B includes narrow front end grooves 70a instead of the front end grooves 70. The groove width of the front end groove 70a is smaller than the groove width of the outer circumferential recess 40. An outer front end edge 54b, a first groove edge 74, a second groove edge 76, and a third groove edge 78 are formed in the front end surface 38a of the probe 38B.

The outer front end edge 54b forms a front end marginal portion of each of the outer circumferential recesses 40. The outer front end edge 54b includes a first edge 80, a second edge 82, and an intermediate edge 84. The first edge 80 forms a marginal portion in the front end surface of the claw 42 on the rear side in the rotation direction of the probe 38B (in the direction opposite to the direction indicated by the arrow R). The first edge 80 is coupled to the front end of first outer circumferential edge 44. The first edge 80 extends inward from the front end of the first outer circumferential edge 44, toward the rotation axis Ax, with inclination toward the rear side in the rotation direction of the probe 38B. That is, an angle θ4 defined between the outer circumferential surface 38b of the probe 38B and the first edge 80 is determined to be an obtuse angle.

The second edge 82 forms a marginal portion in the front surface of the claw 42 on the front side in the rotation direction of the probe 38B (in the direction indicated by the arrow R). The second edge 82 is coupled to the front end of the second outer circumferential edge 46. The second edge 82 extends inward from the front end of the second outer circumferential edge 46, toward the rotation axis Ax, with inclination toward the front side in the rotation direction of the probe 38B. That is, an angle θ5 defined between the outer circumferential surface 38b of the probe 38B and the second edge 82 is determined to be an obtuse angle.

The intermediate edge 84 couples the first edge 80 and the second edge 82 together. The intermediate edge 84 forms a border between the wall surface of the front end groove 70a and the wall surface of the outer circumferential recess 40.

In this modified embodiment, the outer circumferential recess 40 is in the form of a groove, and the groove width of the front end groove 70a is smaller than the groove width of the outer circumferential groove 40.

In the structure, compared with the above described probe 38A, since it is possible to form the claw 42 to have a large thickness, it is possible to improve the rigidity (strength) of the claw 42. Further, it is possible to increase the flow rate of the first softened material 104 flowing through the front end groove 70a. In the structure, it is possible to guide the first softened material 104 in the front end direction of the probe 38B efficiently. Thus, it is possible to improve the welding speed.

Third Modified Embodiment

Next, a probe 38C according to a third modified embodiment will be described. In the description of the probe 38C, constituent elements having the structure identical to that of the probe 38A are labeled with the same reference numerals, and description thereof is omitted. Further, in the probe 38C, the structure similar to that of the probe 38A offers similar effects and advantages.

Figure 7A:
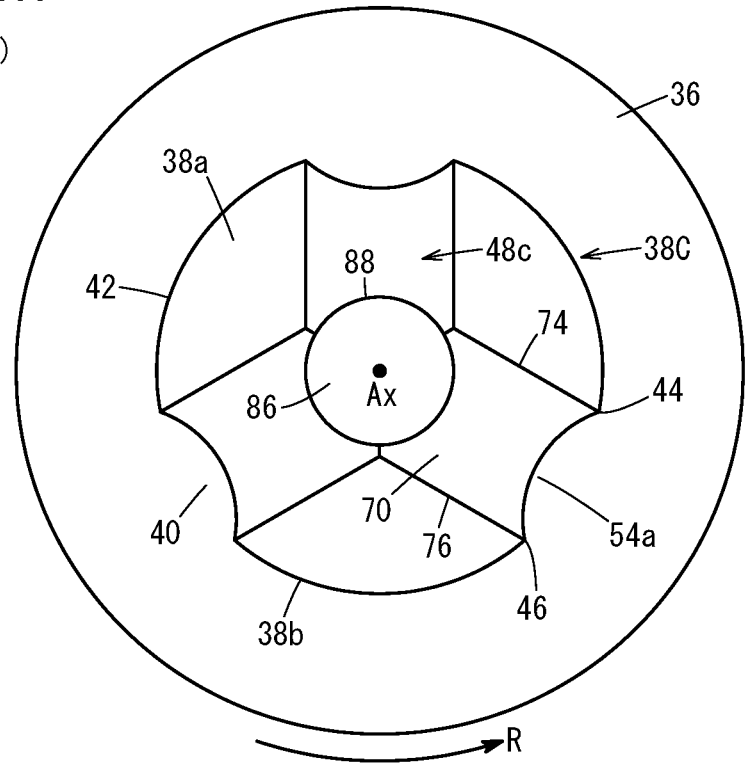
FIG. 7A is a view where a friction stir welding tool including a probe according to a third modified embodiment is viewed from a front end.

As shown in FIG. 7A, a front end recess 48c formed in the front end surface 38a of the probe 38C includes a central recess 86 positioned at the center of the front end surface 38a, and a plurality of (three, in the illustrated embodiment) front end grooves 70 coupling the central recess 86 and the outer circumferential recesses 40 together. The front end recess 48c is rotationally symmetrical about the rotation axis Ax.

The central recess 86 has a circular shape as viewed from the front end of the probe 38C. The wall surface of the central recess 86 has a circular arc shape in cross section along the rotation axis Ax. It should be noted that the cross sectional shape of the wall surface of the central recess 86 may be determined as necessary, and may be a U-shape, or a V-shape, etc. The groove width of the front end groove 70 has the same length as the diameter of the central recess 86. The groove width of the front end groove 70 is the same as the groove width of the outer circumferential recess 40.

An outer front end edge 54a, a first groove edge 74, a second groove edge 76, and a third groove edge 88 are formed in the front end surface 38a of the probe 38C. The third groove edge 88 forms a border between the wall surface of the central recess 86 and the wall surface of the front end groove 70. The third groove edge 88 is coupled to an inner end of the first groove edge 74 and an inner end of the second groove edge 76.

In this modified embodiment, the front end recess 48c includes the central recess 86 positioned at the center of the front end surface 38a, and the front end grooves 70 which couples the central recess 86 and the outer circumferential recesses 40 together.

In the structure, the first softened material 104 taken into the outer circumferential recesses 40 can be guided to the central recess 86 through the front end grooves 70.

The central recess 86 has a circular shape as viewed from the front end of the probe 38C, and the groove width of the front end groove 70 has the same length as the diameter of the central recess 86.

In the structure, in comparison with the case where the groove width of the front end groove 70 is smaller than the diameter of the central recess 86, it is possible to increase the quantity of the first softened material 104 flowing through the front end groove 70.

Fourth Modified Embodiment

Next, a probe 38D according to a fourth modified embodiment will be described. In the description of the probe 38D, constituent elements having the structure identical to that of the probe 38C are labeled with the same reference numerals, and description thereof is omitted. Further, in the probe 38D, the structure similar to that of the probe 38C offers similar effects and advantages.

Figure 7B:
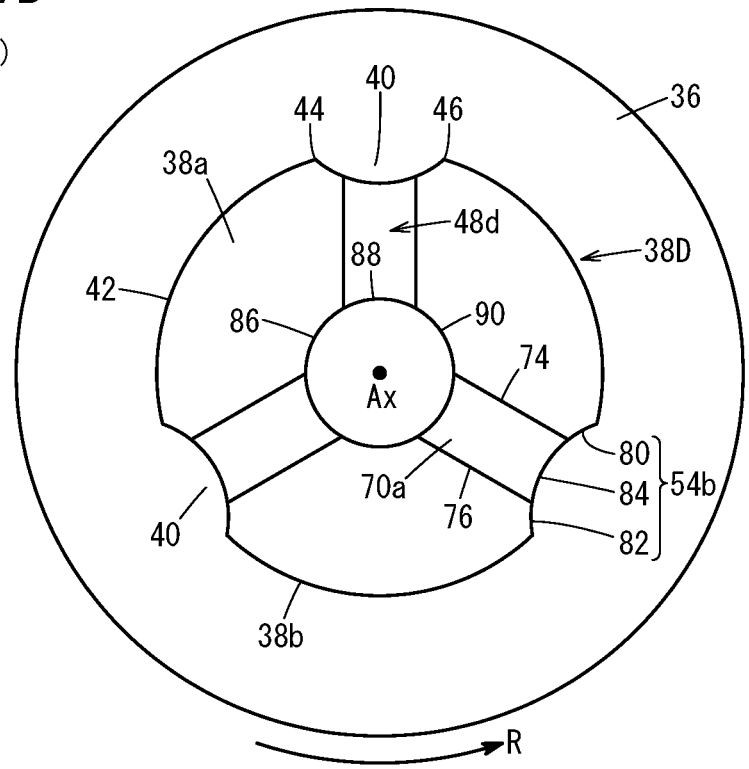
FIG. 7B is a view where a friction stir welding tool including a probe according to a fourth modified embodiment is viewed from a front end.

As shown in FIG. 7B, a front end recess 48d formed in the front end surface 38a of the probe 38D includes narrow front end grooves 70a instead of the front end grooves 70. The groove width of the front end groove 70a is smaller than the groove width of the outer circumferential recess 40. Further, the groove width of the front end groove 70a is smaller than the diameter of the central recess 86.

An outer front end edge 54b, a first groove edge 74, a second groove edge 76, a third groove edge 88, and an inner front end edge 90 are formed in the front end surface 38a of the probe 38D. The inner front end edge 90 forms a border between the wall surface of the central recess 86 and the front end surface of the claw 42.

In this modified embodiment, the central recess 86 is formed to have a circular shape as viewed from the front end of the probe 38D, and the groove width of the front end groove 70a is smaller than the diameter of the central recess 86.

In the structure, it is possible to improve the rigidity (strength) of each of the claws 42. Further, it is possible to improve the flow rate of the first softened material 104 flowing through the front end groove 70a. In the structure, since it is possible to efficiently generate plastic flow of the first softened material 104 in the front end direction of the probe 38D, it is possible to improve the welding speed.

Fifth Modified Embodiment

Next, a probe 38E according to a fifth modified embodiment will be described. In the description of the probe 38E, constituent elements having the structure identical to that of the probe 38A are labeled with the same reference numerals, and description thereof is omitted. Further, in the probe 38E, the structure similar to that of the probe 38A offers similar effects and advantages.

Figure 8:
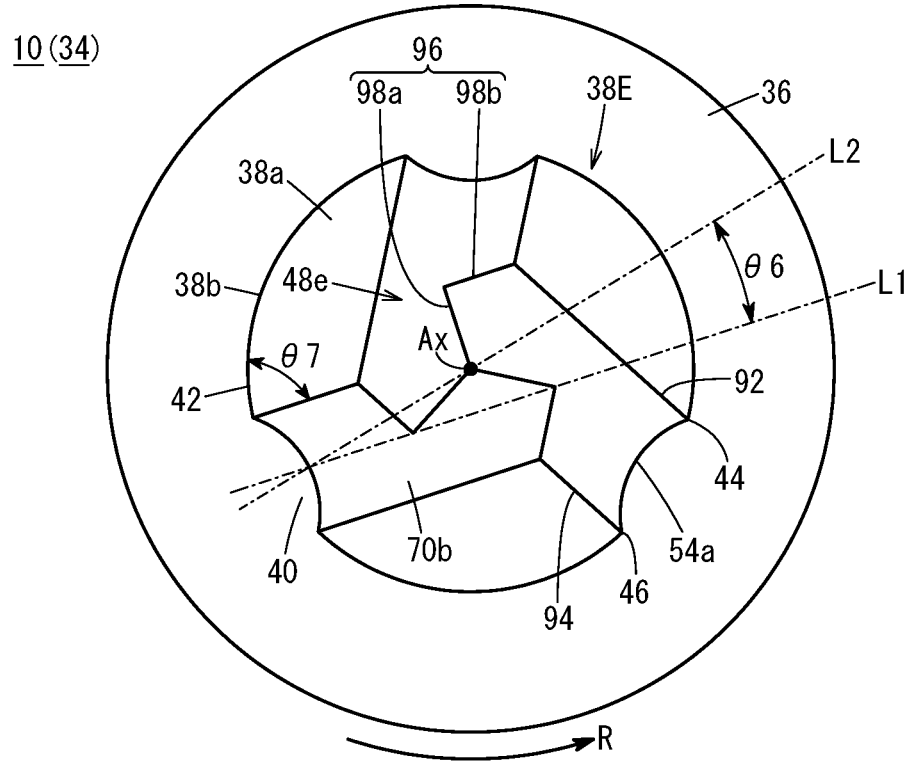
FIG. 8 is a view where a friction stir welding tool including a probe according to a fifth modified embodiment is viewed from a front end.

As shown in FIG. 8, a front end recess 48e formed in the front end surface 38a of the probe 38E includes a plurality of front end grooves 70*b* (three, in the illustrated embodiment) extending straight from the outer circumferential recesses 40 toward positions shifted from the center of the front end surface 38*a* of the probe 38E (rotation axis Ax) in a manner that the front end grooves 70*b* intersect with each other. The front end recess 48*e* is rotationally symmetrical about the rotation axis Ax.

As viewed from the front end of the probe 38E, the front end grooves 70*b* extend straight in a manner that the central line L1 of each of the front end grooves 70*b* passes through a position shifted from the center of the front end surface 38*a* of the probe 38E (rotation axis Ax). An angle (shift angle θ6 of the front end groove 70*b*) defined between a line segment L2 which connects the center of the outer circumferential recess 40 in the width direction and the rotation axis Ax, and the central line L1 can be determined as necessary.

The plurality of front end grooves 70*b* has the same structure. The groove width of each of the front end grooves 70*b* is the same as the groove width of the outer circumferential recess 40. The wall surface of the front end groove 70*b* has a circular shape in lateral cross section. It should be noted that the lateral cross sectional shape of the wall surface of the front end groove 70*b* may be determined as necessary, and may be a U-shape, or a V-shape, etc.

The front end surface 38*a* of the probe 38E includes an outer front end edge 54*a*, a first groove edge 92, a second groove edge 94, and a third groove edge 96. The first groove edge 92 forms a lateral marginal portion in the front end groove 70*b* on the front side in the rotation direction of the probe 38E (in the direction indicated by the arrow R). The outer end of the first groove edge 92 positioned on the outer circumferential side of the probe 38E is coupled to the front end of the first outer circumferential edge 44.

The second groove edge 94 forms a lateral marginal portion in the front end groove 70*b* on the rear side in the rotation direction of the probe 38E (in the direction opposite to the direction indicated by the arrow R). The first groove edge 92 and the second groove edge 94 extend in parallel to each other on both sides of the front end groove 70*b*. The outer end of the second groove edge 94 positioned on the outer circumferential side of the probe 38E is coupled to the front end of the second outer circumferential edge 46.

With respect to the front end grooves 70*b* that are adjacent to each other, the inner end of the first groove edge 92 of one of the front end grooves 70*b* positioned on the central side of the probe 38E is coupled to the inner end of the second groove edge 94 of the other of the front end grooves 70*b* positioned on the central side of the probe 38E. The entire length of the second groove edge 94 is smaller than the entire length of the first groove edge 92. As viewed from the front end of the probe 38E, the central line L1 of the front end groove 70*b* is positioned close to the first groove edge 92 of the front end groove 70*b*, compared with the center of the front end surface 38*a* (rotation axis Ax).

The third groove edge 96 is a ridge extending from the center of the front end surface 38*a* to divide the front end grooves 70*b* which are adjacent to each other. The third groove edge 96 forms a marginal portion of the front end groove 70*b* in which the front end groove 70*b* extends, and forms part of a lateral marginal portion of the adjacent front end groove 70*b*. The third groove edge 96 includes a first straight part 98*a* extending from the center of the front end surface 38*a* and a second straight part 98*b* extending from a coupling part of the first groove edge 92 and the second groove edge 94 up to the first straight part 98*a*. The first straight part 98*a* and the second straight part 98*b* have the same length. Stated otherwise, the intersection between the first straight part 98*a* and the second straight part 98*b* is positioned at an extended end of the front end groove 70*b*.

In this modified embodiment, the front end recess 48*e* includes the front end grooves 70*b* connected to the outer circumferential recesses 40. The plurality of outer circumferential recesses 40 are provided in the circumferential directions of the probe 38E, and the plurality of front end grooves 70*b* are provided in a manner to intersect with each other. As viewed from the front end of the probe 38E, the front end groove 70*b* extends straight in a manner that the central line L1 of the front end groove 70*b* passes through a position shifted from the center of the front end surface 38*a* of the probe 38E, and the claw 42 is formed in the probe 38E, between the front end grooves 70*b* that are adjacent to each other.

In the structure, by adjusting the shift amount (shift angle θ6) between the center of the front end surface 38*a* of the probe 38E and the central line L1 of the front end groove 70*b*, it is possible to change the shape of the claw 42 (improve freedom in designing the shape of the claw 42). Specifically, as the shift angle θ6 decreases, the corner (angle θ7 defined between the outer circumferential surface 38*b* of the probe 38E and the second groove edge 94) in the claw 42 on the front side in the rotation direction of the probe 38E (in the direction indicated by the arrow R) decreases. In this case, the performance of machining the workpiece W by the claw 42 is improved. On the other hand, as the shift angle θ6 increases, the angle θ7 increases. In this case, since it is possible to improve the rigidity (strength) of the claw 42, the durability of the probe 38E is improved.

The third groove edge 96 is formed in the front end surface 38*a*. The third groove edge 96 extends from the center of the front end surface 38*a* in a manner to divide the front end grooves 70*b* that are adjacent to each other.

In the structure, the first softened material 104 which flows plastically through the front end groove 70*b* can be brought into contact with the third groove edge 96, and guided in the front end direction of the probe 38E. In this manner, it is possible to stir the first softened material 104 and the second softened material 106 more effectively.

In the probe 38E according to the modified embodiment, as viewed from the front end of the probe 38E, the central line L1 of the front end groove 70*b* may be positioned close to the second groove edge 94 of the front end groove 70*b*, compared with the center of the front end surface 38*a* (rotation axis Ax). In this case, as the shift angle θ6 decreases, the angle θ7 increases, and as the shift angle θ6 increases, the angle θ7 decreases.

In the probe 38E, the groove width of the front end groove 70*b* may be smaller than the groove width of the outer circumferential recess 40.

The present invention is not limited to the above described embodiments. It is a matter of course that various modifications may be made without departing from the gist of the present invention.

The welding tool 10 may be configured to perform lap welding of a workpiece W which comprises three or more plate members that are stacked together. The welding tool 10 may be used in butt welding, where end surfaces of two plate members are brought into abutment with each other, and the abutting portions are welded together by friction stir welding. The sizes, the shapes, the positions, and the numbers of the outer circumferential recesses 40, and the front end grooves 70, 70*a*, 70*b* can be changed as necessary.

The above embodiments are summarized as follows:

The above embodiments disclose the friction stir welding tool (10) including the probe (38A to 38E) having the front end surface (38a) and the outer circumferential surface (38b), wherein the outer circumferential recess (40) extending up to the front end surface (38a) is formed in the outer circumferential surface (38b), and the friction stir welding tool (10) is configured to rotate the probe (38A to 38E) about the rotation axis (Ax), and embed the probe (38A to 38E) inside the workpiece (W) during rotation of the probe (38A to 38E) to weld the workpiece (W), and wherein the front end recess (48, 48a to 48e) is formed in the front end surface (38a), and the front end recess (48, 48a to 48e) is positioned at the central part of the front end surface (38a), and connected to the outer circumferential recess (40).

In the above described friction stir welding tool (10), the front end recess (48a) may include the central recess (50) positioned at the center of the front end surface (38a), and the outer circumferential recess (40) may be formed by cutting the outer marginal portion of the central recess (50) partially.

In the above described friction stir welding tool (10), the front end recess (48b) include a front end groove (70, 70a), and the front end groove (70, 70a) may extend outward in the radial direction of the probe (38A to 38D) from the center of the front end surface (38a), and the front end groove (70, 70a) may be connected to the outer circumferential recess (40).

In the above described friction stir welding tool (10), the outer circumferential recess (40) may comprise a plurality of outer circumferential recesses and the front end groove (70, 70a) may comprise a plurality of front end grooves, and the ridge (78) may be formed in the front end surface (38a) in a manner that the ridge (78) extends from the center of the front end surface (38a) to divide the front end grooves (70, 70a) that are adjacent to each other.

In the above described friction stir welding tool (10), the outer circumferential recess (40) may be in the form of a groove, and the groove width of the front end groove (70a) may be smaller than the groove width of the outer circumferential recess (40).

In the above described friction stir welding tool (10), the front end recess (48c, 48d) may include the central recess (86) provided at the center of the front end surface (38a) and the front end groove (70, 70a) configured to couple the central recess (86) and the outer circumferential recess (40) together.

In the above described friction stir welding tool (10), the central recess (86) may have a circular shape as viewed from the front end of the probe (38C), and the groove width of the front end groove (70) may have the same length as the diameter of the central recess (86).

In the above described friction stir welding tool (10), the central recess (86) may have a circular shape as viewed from the front end of the probe (38D), and the groove width of the front end groove (70a) may be smaller than the diameter of the central recess (86).

In the above described friction stir welding tool (10), the front end recess (48e) may include the front end groove (70b) connected to the outer circumferential recess (40), the outer circumferential recess (40) may comprise a plurality of outer circumferential recesses (40) provided in a circumferential direction of the probe (38E), the front end groove (70b) may comprise a plurality of front end grooves (70b) provided in a manner to intersect with each other, the front end grooves (70b) may extend straight in a manner that, as viewed from the front end of the probe (38E), the central line (L1) of each of the front end grooves (70b) passes through a position shifted from the center of the front end surface (38a) of the probe (38E), and the claw (42) may be formed in the probe (38E), between the front end grooves (70b) that are adjacent to each other.

In the above described friction stir welding tool (10), the ridge (96) may be formed in the front end surface (38a) in a manner that the ridge (96) extends from the center of the front end surface (38a) to divide the front end grooves (70b) that are adjacent to each other.

In the above described friction stir welding tool (10), the outer front end edge (54, 54b) may be formed in the front end surface (38a), and the outer front end edge (54, 54b) may form a marginal portion in the outer circumferential recess (40) in the front end direction of the probe (38, 38B, 38D), and the outer front end edge (54a, 54b) may extend in a manner that an angle (θ1, θ2, θ4, θ5) defined between the outer front end edge (54, 54b) and the outer circumferential surface (38b) becomes an obtuse angle.

What is claimed is:

1. A friction stir welding tool comprising a probe having a front end surface and an outer circumferential surface, wherein an outer circumferential recess extending up to the front end surface is formed in the outer circumferential surface, and the friction stir welding tool is configured to rotate the probe about the rotation axis, and embed the probe inside a workpiece during rotation of the probe to weld the workpiece, and
   wherein a front end recess is formed in the front end surface, and the front end recess is positioned at a central part of the front end surface, and connected to the outer circumferential recess,
   the front end recess includes a front end groove, and the front end groove extends outward in a radial direction of the probe from a center of the front end surface, and the front end groove is connected to the outer circumferential recess,
   the outer circumferential recess comprises a plurality of outer circumferential recesses and the front end groove comprises a plurality of front end grooves, and
   a ridge is formed in the front end surface in a manner that the ridge extends from the center of the front end surface to divide the front end grooves that are adjacent to each other.

2. The friction stir welding tool according to claim 1, wherein the front end recess includes a central recess positioned at a center of the front end surface; and
   a boundary between a wall defining the outer circumferential recess and a wall defining the front end recess is in a shape of a curved line convex toward the rotation axis of the probe.

3. The friction stir welding tool according to claim 1, wherein the outer circumferential recess is in the form of a groove; and
   a groove width of the front end groove is smaller than a groove width of the outer circumferential recess.

4. A friction stir welding tool comprising a probe having a front end surface and an outer circumferential surface, wherein an outer circumferential recess extending up to the front end surface is formed in the outer circumferential surface, and the friction stir welding tool is configured to rotate the probe about the rotation axis, and embed the probe inside a workpiece during rotation of the probe to weld the workpiece, and
   wherein a front end recess is formed in the front end surface, and the front end recess is positioned at a central part of the front end surface, and connected to the outer circumferential recess, wherein the front end recess includes a front end groove connected to the outer circumferential recess; and the outer circumferential recess comprises a plurality of outer circumferential recesses provided in a circumferential direction of the probe;

the front end groove comprises a plurality of front end grooves provided in a manner to intersect with each other;

the front end grooves extend straight in a manner that, as viewed from a front end of the probe, the central line of each of the front end grooves passes through a position shifted from a center of the front end surface of the probe; and a claw is formed in the probe, between the front end grooves that are adjacent to each other.

5. The friction stir welding tool according to claim 4, wherein a ridge is formed in the front end surface in a manner that the ridge extends from the center of the front end surface to divide the front end grooves that are adjacent to each other.

6. The friction stir welding tool according to claim 1, wherein an outer front end edge is formed in the front end surface at an end of the outer circumferential recess in the front and outer end direction of the probe; and the outer front end edge extends in a manner that an angle defined between the outer front end edge and the outer circumferential surface becomes an obtuse angle.

* * * * *